(12) United States Patent
Yun et al.

(10) Patent No.: US 9,198,201 B2
(45) Date of Patent: Nov. 24, 2015

(54) METHOD OF DIRECT COMMUNICATION BETWEEN TERMINALS RESPECTIVELY CONNECTED AND UNCONNECTED TO BASE STATION

(71) Applicant: Electronics and Telecommunications Research Institute, Daejeon (KR)

(72) Inventors: Mi Young Yun, Daejeon (KR); Chul Sik Yoon, Daejeon (KR); Hyun Lee, Daejeon (KR); Seokki Kim, Gyeonggi-do (KR); Won-Ik Kim, Daejeon (KR); Sung Kyung Kim, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 253 days.

(21) Appl. No.: 13/937,803

(22) Filed: Jul. 9, 2013

(65) Prior Publication Data

US 2014/0016531 A1    Jan. 16, 2014

(30) Foreign Application Priority Data

Jul. 10, 2012  (KR) .......................... 10-2012-0075227
Jul. 9, 2013   (KR) .......................... 10-2013-0080597

(51) Int. Cl.
  H04H 20/71   (2008.01)
  H04W 76/00   (2009.01)
  H04W 76/02   (2009.01)

(52) U.S. Cl.
  CPC .......... *H04W 76/002* (2013.01); *H04W 76/023* (2013.01)

(58) Field of Classification Search
  CPC . H04W 76/002; H04W 76/02; H04W 76/023; H04W 4/06
  See application file for complete search history.

(56) References Cited

U.S. PATENT DOCUMENTS

| 2004/0190468 | A1* | 9/2004 | Saijonmaa | ..................... 370/312 |
| 2012/0002583 | A1* | 1/2012 | Kong et al. | ................... 370/312 |
| 2013/0016646 | A1  | 1/2013 | Chang et al. | |
| 2013/0039324 | A1* | 2/2013 | Kwon et al. | ................... 370/329 |

FOREIGN PATENT DOCUMENTS

KR    2013-0008482 A    1/2013

* cited by examiner

*Primary Examiner* — Anh Ngoc Nguyen
(74) *Attorney, Agent, or Firm* — Rabin & Berdo, P.C.

(57) ABSTRACT

Referring to FIG. 4, if the direct communication terminal 120, among the direct communication terminals 120 and 130 receiving a downlink multicast service from the base station 200 through the forwarding terminal 110, wants to be a talker, the direct communication terminal 120 performs a unicast connection establishment procedure with the forwarding terminal 110, in order to transmit an uplink unicast packet.

15 Claims, 7 Drawing Sheets

METHOD OF DIRECT COMMUNICATION BETWEEN TERMINALS RESPECTIVELY CONNECTED AND UNCONNECTED TO BASE STATION

CROSS-REFERENCE TO RELATED APPLICATION

This application claims priority to and the benefit of Korean Patent Application Nos. 10-2012-0075227 and 10-2013-0080597 filed in the Korean Intellectual Property Office on Jul. 10, 2012 and Jul. 9, 2013, the entire contents of which are incorporated herein by reference.

BACKGROUND OF THE INVENTION (a) Field of the Invention

The present invention relates to a method of direct communication, and more particularly, to a method of direct communication that provides services through a communication infrastructure to a terminal not connected to the communication infrastructure.

(b) Description of the Related Art

A method of performing talk-around direct communication was suggested that uses a specific resource area in an environment where a communication infrastructure between a terminal and a base station is built. Still, even in such direct communication, there is a need to use a communication infrastructure, in order to exchange information with a backbone network or widen the service area.

In talk-around direct communication, a terminal not connected to the communication infrastructure can still get services through the communication infrastructure by using a terminal connected to the communication infrastructure. However, there is a problem that the base station has to manage the terminal not connected to the communication infrastructure.

SUMMARY OF THE INVENTION

The present invention has been made in an effort to provide a method of direct communication that provides communication infrastructure services to a terminal not connected to a communication infrastructure, without a base station needing to manage the terminal not connected to the communication infrastructure.

An exemplary embodiment of the present invention provides a method of performing direct communication between a forwarding terminal connected to a base station and a direct communication terminal not connected to the base station. The method of direct communication includes: receiving a multicast packet from the base station; establishing a multicast connection with at least one direct communication terminal having a direct communication group identifier mapped to a multicast IP address of the multicast packet; and transmitting the multicast packet to the at least one direct communication terminal.

The establishing may include transmitting a link establishment command message to the at least one direct communication terminal, the link establishment command message containing the direct communication group identifier.

The method of direct communication may further include performing a multicast forwarding initiation procedure before the establishing.

The performing of a multicast forwarding initiation procedure may include broadcasting to a plurality of direct communication terminals a forwarding advertisement message for indicating service status information.

The broadcasting may include periodically broadcasting the forwarding advertisement message.

The forwarding advertisement message may contain at least one of the following: the identifier of the forwarding terminal, a list of candidate direct communication group identifiers, and a list of on-going direct communication group identifiers.

The performing of a multicast forwarding initiation procedure may further include receiving a forwarding join message from one of the at least one direct communication terminal, the forwarding join message containing a direct communication group identifier, among the list of candidate direct communication group identifiers, that is mapped to the multicast packet the at least one direct communication terminal wants to receive.

The performing of a multicast forwarding initiation procedure may further include establishing a service connection with the base station, in order to provide the multicast packet mapped to the direct communication group identifier contained in the forwarding join message.

The method of direct communication may further include, if there is no signal received from the at least one direct communication terminal for a predetermined period of time, releasing the multicast connection with the at least one direct communication terminal.

The releasing may include transmitting a direct communication link release command message to the at least one direct communication terminal, the direct communication link release command message containing the direct communication group identifier.

The method of direct communication may further include transmitting a unicast packet from one direct communication terminal to the base station while transmitting the multicast packet.

The transmitting of a unicast packet to the base station may include: receiving a link establishment request message for unicast connection establishment from the one direct communication terminal; and transmitting a response message to the one direct communication terminal in reply to the link establishment request message, and the link establishment request message containing the identifier of the forwarding terminal and a currently on-going direct communication group identifier as destination information.

The transmitting of a unicast packet to the base station may further include: upon completion of the unicast connection establishment, receiving the unicast packet from the one direct communication terminal; and converting the unicast packet into an IP packet and transmitting the same to the base station.

The IP packet may contain a server address as the target address to be mapped to the direct communication group identifier and the address of the forwarding terminal as the source address.

The transmitting may include converting the multicast packet into a direct communication packet.

Another exemplary embodiment of the present invention provides a method for performing direct communication between a forwarding terminal connected to a base station and a direct communication terminal not connected to the base station. The method of direct communication includes: receiving a multicast packet from the base station; transmitting a link establishment command message containing the direct communication group identifier to at least one direct communication terminal having a direct communication group identifier mapped to a multicast IP address of the multicast packet; converting the multicast packet into a direct communication packet; and transmitting the multicast packet to the at least one direct communication terminal.

The method of direct communication may further include periodically broadcasting to a plurality of direct communication terminals a forwarding advertisement message for indicating service status information, the forwarding advertisement message containing at least one of the following: the identifier of the forwarding terminal, a list of candidate direct communication group identifiers, and a list of on-going direct communication group identifiers.

The method of direct communication may further include receiving a forwarding join message from one of the at least one direct communication terminal, the forwarding join message containing a direct communication group identifier, among the list of candidate direct communication group identifiers, that is mapped to the multicast packet the at least one direct communication terminal wants to receive.

The method of direct communication may further include, if there is no signal received from the at least one direct communication terminal for a predetermined period of time, transmitting a direct communication link release command message to the at least one direct communication terminal, the direct communication link release command message containing the direct communication group identifier.

The method of direct communication may further include: receiving a link establishment request message for unicast connection establishment from one of the at least one direct communication terminal while transmitting the multicast packet; transmitting a response message to the one direct communication terminal in reply to the link establishment request message; receiving a unicast packet from the one direct communication terminal; and converting the unicast packet into an IP packet and transmitting the same to the base station, the link establishment request message containing the identifier of the forwarding terminal and a currently on-going direct communication group identifier as destination information, and the IP packet containing a server address as the target address to be mapped to the direct communication group identifier and the address of the forwarding terminal as the source address.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

In the specification, the term "mobile station (MS)" may designate a mobile station (MS), a mobile terminal (MT), a subscriber station (SS), a portable subscriber station (PSS), an access terminal (AT), a user equipment (UE), etc, or may include all or some functions of the terminal, MT, SS, PSS, AT, UE, etc.

Further, the term "base station" (BS) may designate a node B, an evolved node B (eNodeB), an access point (AP), a radio access station (RAS), a base transceiver station (BTS), an MMR (mobile multihop relay)-BS, etc, or may include all or some functions of the nodeB, eNodeB, AP, RAS, BTS, MMR-BS, etc.

Now, a method of direct communication in accordance with an exemplary embodiment of the present invention will be described in detail with reference to the drawings.

Figure 1:
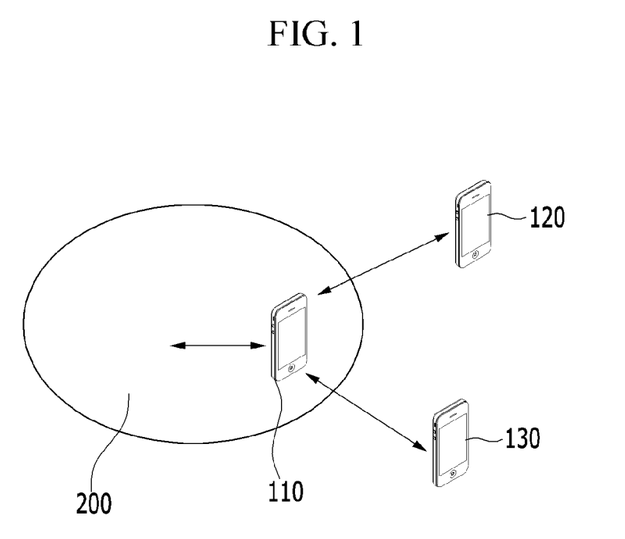
FIG. 1 is a view showing a direct communication environment in accordance with an exemplary embodiment of the present invention.

FIG. 1 is a view showing a direct communication environment in accordance with an exemplary embodiment of the present invention.

Referring to FIG. 1, a direct communication system includes a plurality of direct communication terminals 110, 120, and 130.

The plurality of direct communication terminals 110, 120, and 130 are capable of performing talk-around direct communication.

The plurality of direct communication terminals 110, 120, and 130 can serve as forwarding terminals according to their capability. A forwarding terminal must receive talk-around direct communication traffic, in order to support unicast transmission from lower-level direct communication terminals, and also must receive a connection attempt anytime from the lower-level direct communication terminals. In addition, the forwarding terminals must be able to perform a protocol conversion function between direct communication services and infrastructure communication services. Any of the direct communication terminals 110, 120, and 130 can serve as a forwarding terminal capable of performing this function. That is, the forwarding terminal refers to a terminal that is connected to a base station 200 of a backbone network and capable of performing infrastructure communication with the base station 200 and talk-around direct communication. FIG. 1 assumes that the direct communication terminal 110 is a forwarding terminal, and the direct communication terminal 110 is designated by the forwarding terminal 110 for convenience of explanation.

The forwarding terminal 110 may include an infra communication interface and a direct communication interface. Accordingly, the forwarding terminal 110 can perform the protocol conversion function between infrastructure communication and talk-around direct communication. Since the forwarding terminal 110 has limited transmission power, an uplink subframe may not transmit infrastructure communication data and talk-around direct communication data simultaneously. If infrastructure communication data and talk-around direct communication data are transmitted simultaneously, they cannot be transmitted properly to the destination, resulting in transmission efficiency degradation.

The direct communication terminals 120 and 130 are terminals not connected to the backbone network, which can get infrastructure communication services, without an IP address for infrastructure communication services assigned from the base station 200. That is, the direct communication terminals 120 and 130 are lower-level direct communication terminals of the forwarding terminal 110, which can get infrastructure communication services through the forwarding terminal 110.

The infrastructure communication services that can be provided through the forwarding terminal 110 may include a downlink multicast service and an uplink unicast service.

The direct communication terminals 120 and 130 can use the IP address of the forwarding terminal 110 for the uplink unicast service. Still, for a downlink unicast service, it is difficult for the forwarding terminal 110 to assign, cancel, and manage addresses to identify different direct communication flows for the direct communication terminals 120 and 130. Accordingly, the infrastructure communication services in accordance with an exemplary embodiment of the present invention do not include the downlink unicast service.

The forwarding terminal 110 can map and manage a Direct Communication Group Identifier (DCGID) and a multicast IP address for multicast transmission, in order to provide the downlink multicast service.

That is, the direct communication terminals 120 and 130 may be included in a preset direct communication group for multicast services, and the direct communication terminals 120 and 130 may belong to the same group or different groups. The direct communication terminals 120 and 130 are aware of the identifier DCGID in advance by which the direct communication group to which they belong can be identified.

The forwarding terminal 110 manages the mapping of a DCGID and a multicast IP address for multicast transmission, in order to forward multicast traffic to a direct communication group.

The forwarding terminal 110 is aware of a list of DCGIDs that it can forward and multicast service IP addresses mapped to these DCGIDs in advance, and activates the mapping of a DCGID, received in a AAI-DC-FWD-JOIN message from the lower-level direct communication terminals 120 and 130 in the direct communication group list, and a multicast IP address, and forwards only the traffic corresponding to the activated mapping. In the case of broadcast services, traffic can always be forwarded without any other settings.

In addition, the forwarding terminal 110 maps and manages a DCGID and the address of an application server (not shown) providing a downlink multicast service, in order to provide an uplink unicast service to the direct communication terminals 120 and 130 during the downlink multicast service. The address of an application server providing a multicast service can be obtained using IP address information of a downlink multicast traffic source.

Figure 2:
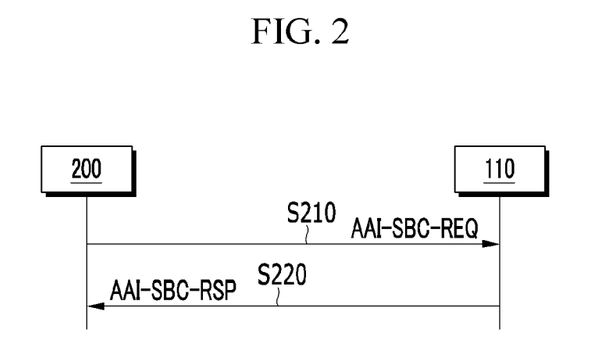
FIG. 2 is a view schematically showing part of a network entry procedure of a forwarding terminal in accordance with an exemplary embodiment of the present invention.

FIG. 2 is a view schematically showing part of a network entry procedure of a forwarding terminal in accordance with an exemplary embodiment of the present invention.

Referring to FIG. 2, the forwarding terminal 110 conducts a basic capability negotiation process with the base station 200 for the sake of network entry.

The forwarding terminal 110 transmits to the base station 200 an Advanced Air Interface-Subscriber Station Basic Capability Request (AAI-SBC-REQ) message (S210). The AAI-SBC-REQ message is a message that the forwarding terminal 110 sends to negotiate basic capability with the base station 200. As shown in Table 1, the AAI-SBC-REQ message includes information about forwarding capability support. Forwarding capability is information indicating whether the forwarding terminal 110 is capable of forwarding data between the base station 200 and the direct communication terminals 120 and 130. That is, the forwarding terminal 110 can notify the base station 200 of whether or not forwarding capability is supported, through the AAI-SBC-REQ message.

TABLE 1

| Field | Size (bits) | Value/Description | Condition |
|---|---|---|---|
| ... | | | |
| If (HR-RS is the sender of AAI-SBC-REQ) { | | | |
| Local Forwarding Capability | 2 | 0b00: LF is not supported<br>0b01: HR-RS detects LF opportunity and performs LF<br>0b10: HR-RS does not detect LF opportunity but can perform LF<br>0b11: reserved | Present if needed in HR Network |
| } | | | |
| Direct Communication Forwarding Capability supported | 1 | 0x0: the capability as a Forwarding HR-MS is not supported<br>0x1: the capability as a Forwarding HR-MS is supported | Present during the network entry procedure of HR-MS having the capability of Talk-around Direct Communication |
| For (i=0; i<N Slot; i++){ | | N Slot is the number of Direct Mode Slot in the Talk-around Direct Communication frame structure to prevent an HR-BS from allocating the corresponding subframes | Present if Direct Communication Forwarding Capability supported == 1 |

TABLE 1-continued

| Field | Size (bits) | Value/Description | Condition |
|---|---|---|---|
| | | for the HR-MS in order to support forwarding to the network | |
| Direct Mode Zone Type | 2 | Direct mode zone type for preventing an HR-BS from allocating downlink or uplink subframes<br>0x0: Common direct mode zone (CDMZ)<br>0x1: Common direct mode zone extended (CDMZ-E)<br>0x2: Cell specific direct mode zone (CSDMZ)<br>0x3: Reserved. | |
| Direct Mode Slot Number prohibiting allocation | 1 | Slot Number in the Talk-around Direct Communication frame structure to prevent an HR-BS from allocation of the infra-structure resources for the corresponding subframes for the HR-MS<br>0x0: Slot 1<br>0x1: Slot 2 | |
| } | | | |

As shown in Table 1, if the forwarding terminal 110 supports forwarding capability, the AAI-SBS-REQ message may further include a Direct Mode Zone Type, which is a direct communication resource information identifier for preventing the base station 200 from allocating uplink resources, among radio resources for direct communication, for the forwarding terminal 110, and a Direct Mode Slot Number prohibiting allocation, in order to prevent overlapping between a subframe in which the forwarding terminal 110 has to receive uplink data from the direct communication terminals 120 and 130 and a subframe in which the base station 200 allocates uplink resources for uplink transmission from the forwarding terminal 110 to the base station 200.

Upon receiving the AAI-SBC-REQ message from the forwarding terminal 110, the base station 200 transmits an AAI-Subscriber Station Basic Capability Response (AAI-SBC-RSP) message to the forwarding terminal 110 and notifies the forwarding terminal 110 of the common capability of the forwarding terminal 110 and the base station 200 (S220). The AAI-SBC-RSP message may be as shown in Table 2.

TABLE 2

| Field | Size (bits) | Value/Description | Condition |
|---|---|---|---|
| . . . | . . . | . . . | . . . |
| Local Forwarding Capability | 2 | 0b00: LF is not allowed<br>0b01: HR-BS detects LF opportunity and HR-RS performs LF as needed<br>0b10: HR-RS detects LF opportunity and HR-RS performs LF as needed<br>0b11: ASN detects LF opportunity and HR-RS performs LF as needed | Present if needed in HR Network |
| Direct Communication Forwarding Capability | 1 | 0x0: the capability as a Forwarding HR-MS<br>0x1: the capability as a Forwarding HR-MS is | Present during the network entry procedure of HR-MS having |

TABLE 2-continued

| Field | Size (bits) | Value/Description | Condition |
|---|---|---|---|
| | | supported | the capability of Talk-around Direct Communication |
| For (i=0; i<N Slot; i++){ | | N Slot is the number of Direct Mode Slot in the Talk-around Direct Communication frame structure to prevent an HR-BS from allocating the corresponding subframes for the HR-MS in order to support forwarding to the network | Present if Direct Communication Forwarding Capability supported == 1 |
| Direct Mode Zone Type | 2 | Direct mode zone type for preventing an HR-BS from allocating downlink or uplink subframes<br>0x0: Common direct mode zone (CDMZ)<br>0x1: Common direct mode zone extended (CDMZ-E)<br>0x2: Cell specific direct mode zone (CSDMZ)<br>0x3: Reserved. | |
| Direct Mode Slot Number prohibiting allocation | 1 | Slot Number in the Talk-around Direct Communication frame structure to prevent an HR-BS from allocation of the infra-structure resources for the corresponding subframes for the HR-MS<br>0x0: Slot 1<br>0x1: Slot 2 | |
| } | | | |

The forwarding terminal 110 completes the basic capability negotiation process by receiving the AAI-SBC-RSP message from the base station 200.

Figure 3:
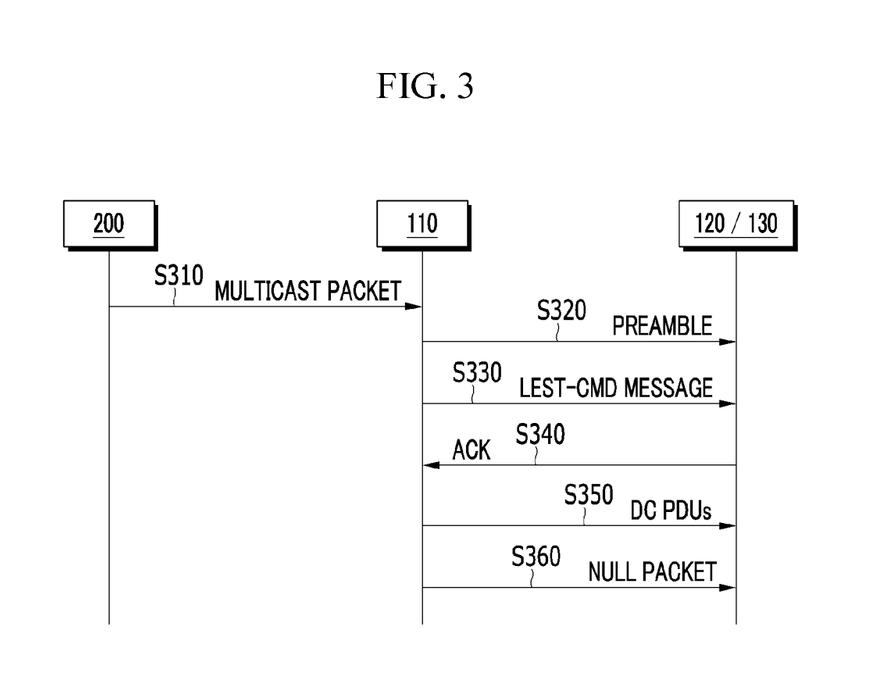
FIG. 3 is a view showing a method for providing a downlink multicast service in accordance with an exemplary embodiment of the present invention.

FIG. 3 is a view showing a method for providing a downlink multicast service in accordance with an exemplary embodiment of the present invention.

Referring to FIG. 3, upon receiving a multicast packet from an external application server, the base station 200 transmits the multicast packet to the forwarding terminal 110 by using a pre-mapped flow identifier (FID) or multicast IP address (S310). The multicast packet has a single FID or multicast IP address, and the FID or multicast IP address is mapped to the DCGID of a direct communication terminal.

Having received the multicast packet, the forwarding terminal 110 checks whether there exists a DCGID mapped to the FID or multicast IP address, and if so, performs a talk-around direct communication multicast connection establishment procedure.

In order to establish a talk-around direct communication multicast connection, the forwarding terminal 110 transmits a preamble to the direct communication terminals 120 and 130 having the corresponding DCGID (S320). Next, the forwarding terminal 110 transmits an AAI-DC-Link establishment command (AAI-DC-LEST-CMD) message to the direct communication terminals 120 and 130 (S330). In this case, the forwarding terminal 110 can transmit a link establishment command (AAI-DC-LEST-CMD) message to the direct communication terminals 120 and 130, by piggybacking it on an RTS (Request to send) message indicating that the forwarding terminal 110 wants to transmit data. The link establishment command (AAI-DC-LEST-CMD) message may contain a DCGID. Upon successfully receiving the link establishment command message, the direct communication terminals 120 and 130 may transmit a reception success acknowledgment (ACK) over an auxiliary channel (S340) or not.

Upon completing the talk-around direct communication multicast connection establishment, the forwarding terminal 110 converts the multicast packet into a direct communication packet (DC PDUs) and forwards the direct communication packet (DC PDUs) (S350).

If the forwarding terminal 110 has not received a multicast packet from the application server for a set period of time, it may transmit a null packet to the direct communication terminals 120 and 130, in order to maintain a talk-around direct communication multicast connection (S360).

If the forwarding terminal 110 receives a multicast packet from the application server, it may convert the multicast packet into a direct communication packet (DC PDUs) and forward the direct communication packet (DC PDUs) through an established multicast connection.

In this way, the direct communication terminals 120 and 130 can get a downlink multicast service from the base station 200, without being connected to the base station 200. If the direct communication terminals 120 and 130 want to be a talker in group communication while receiving a downlink multicast service from the base station 200, they can send a request for uplink unicast connection establishment.

Figure 4:
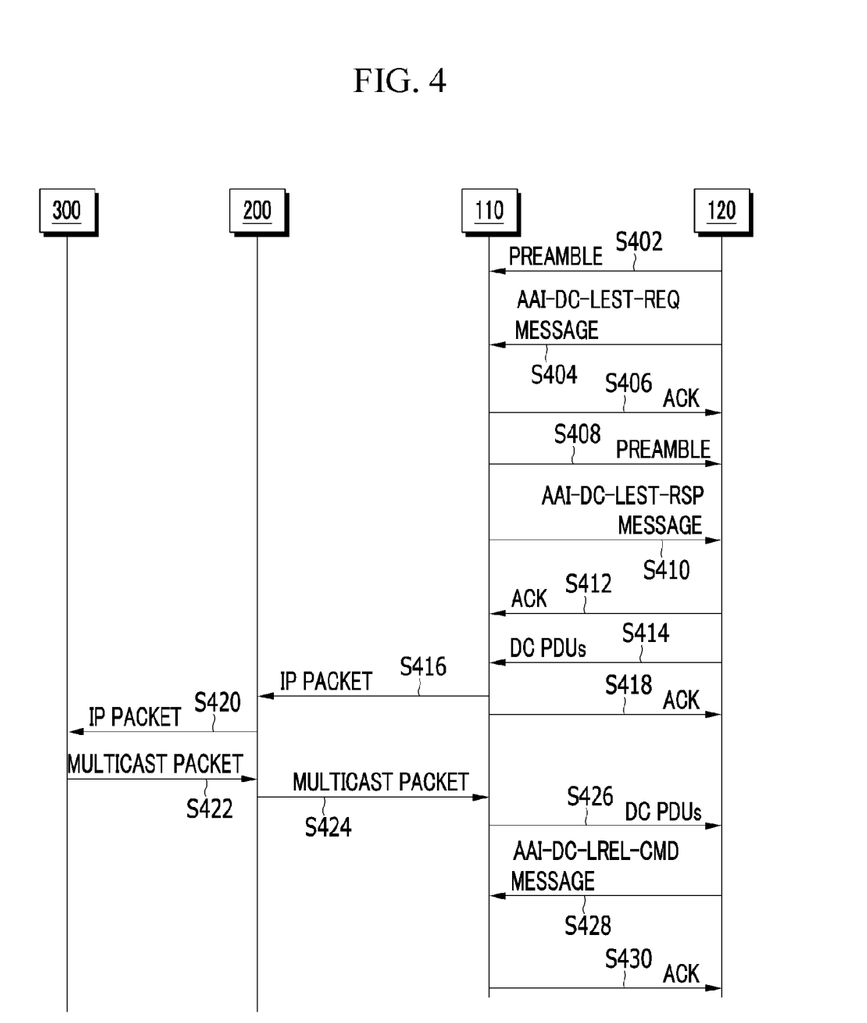
FIG. 4 is a view showing a method for providing an uplink unicast service in accordance with an exemplary embodiment of the present invention.

FIG. 4 is a view showing a method for providing an uplink unicast service in accordance with an exemplary embodiment of the present invention.

Referring to FIG. 4, if the direct communication terminal 120, among the direct communication terminals 120 and 130 receiving a downlink multicast service from the base station 200 through the forwarding terminal 110, wants to be a talker, the direct communication terminal 120 performs a unitcast connection establishment procedure with the forwarding terminal 110, in order to transmit an uplink unicast packet.

The direct communication terminal 120 transmits a preamble to the forwarding terminal 110 in order to establish a unicast connection (S402). Next, the direct communication terminal 120 transmits a link establishment request (AAI-LEST-REQ) message to the forwarding terminal 110 (S404). In this case, the direct communication terminal 120 can transmit a link establishment request (AAI-LEST-REQ) message to the forwarding terminal 110 by piggybacking it on an RTS message. The RTS message may include the DCTID (source DCTID) of the direct communication terminal 120 wanting to transmit an uplink unicast packet and a target DCTID. In addition, as shown in Table 3, the link establishment request (AAI-LEST-REQ) message may include a Forwarding Request Indicator indicating whether or not the direct communication terminal 120 has selected traffic to be forwarded and the target DCGID of a multicast service that the direct communication terminal 120 is receiving. In this case, the target DCTID is the DCTID of the forwarding terminal 110. Particularly, the target address of the traffic, based on the target DCGID of the multicast service provided by the direct communication terminal 120, that the forwarding terminal 110 has received from the direct communication terminal 120 can be obtained using mapping information of DCGIDs and multicast IP addresses managed by the forwarding terminal 110. This offers the advantage that a direct communication terminal does not need to manage the destination IP address of unicast uplink traffic.

TABLE 3

| Field | Size (bits) | Value/Description | Condition |
|---|---|---|---|
| Link Change Count | 4 | The change count of this transaction assigned by the sender. If new transaction is started, Link Change Count is incremented by one (modulo 16) by the sender. | Shall always be present |
| For (i=0; i<N_Flow_Est; i++) { | | N_Flow_Est is the number of flows on which the sender of this message sends MAC PDUs. Range [0 . . . 1] | |
| FID | 4 | Flow identifier assigned by the source station of packets on the flow | |
| Traffic Priority | 3 | 0 to 7: Higher numbers indicate higher priority Default: 0 | |
| CS Specification Parameters | 8 | 0-15: Reserved 16: Voice Codec G.729A 17: Voice Codec AMR 18-255: Reserved | |
| MAC Header Type | 1 | Indicates whether AGMH or SPMH is presented at the start of MAC PDUs of the service flow. 0: AGMH (Advanced Generic MAC Header) 1: SPMH (Short-Packet MAC header) default value is 0. | |

TABLE 3-continued

| Field | Size (bits) | Value/Description | Condition |
|---|---|---|---|
| } | | | |
| Forwarding Request Indicator | 1 | Indicate that an HR-MS requests forwarding to network 0b0: Not request forwarding to network 0b1: Request forwarding to network | |
| Target DCGID | 24 | DC Group Identifier. Indicate that the target address for forwarding to network | |
| Reserved | 2 | | |

Upon successfully receiving the link establishment request (AAI-LEST-REQ) message, the forwarding terminal 110 transmits the success or failure of message reception, i.e., a reception success acknowledgment (ACK), to the direct communication terminal 120 over an auxiliary channel S406.

Next, the forwarding terminal 110 transmits a preamble to the direct communication terminal 120 (S408). In talk-around direct communication, the preamble is used to provide distributed synchronization.

The forwarding terminal 110 transmits to the direct communication terminal 120 an AAI-direct communication link establishment response (AAI-DC-LEST-RSP) message as a response to the link establishment request (AAI-LEST-REQ) message (S410).

The forwarding terminal 110 can transmit a direct communication forwarding response (AAI-DC-LEST-RSP) message to the direct communication terminal 120 by piggybacking it on a CTS (Clear to send) message.

Upon successfully receiving the direct communication forwarding response (AAI-DC-LEST-RSP) message, the direct communication terminal 120 transmits a reception success acknowledgment (ACK) to the forwarding terminal 110 (S412).

In this way, upon completion of the unicast connection establishment between the direct communication terminal 120 and the forwarding terminal 110, the direct communication terminal 120 transmits uplink traffic (DC PDUs) to the forwarding terminal 110 (S414).

Upon receiving the uplink traffic (DC PDUs), the forwarding terminal 110 converts the traffic received from the direct communication terminal 120 into an IP packet and transmits the IP packet to the base station 200 (S416). In this case, the target address of the IP packet is the address of the application server 300 mapped to the DCGID, and the source address of the IP packet is the IP address of the forwarding terminal 110. In addition, the forwarding terminal 110 transmits the reception success acknowledgment (ACK) of the uplink traffic (DC PDUs) to the direct communication terminal 120 (S418). In this case, the forwarding terminal 110 can prevent the direct communication terminal 130 from sending an uplink unicast forwarding request, by informing the other lower-level direct communication terminal 130 that an uplink unicast service is being offered.

Upon receiving the IP packet, the base station 200 can transmit the IP packet to the application server 300 corresponding to the target address (S420).

In this way, upon completion of the uplink unicast service, the base station 200 can provide a downlink multicast service over again to the direct communication terminal 120 through the forwarding terminal 110 (S422-S426).

Meanwhile, the direct communication terminal 120 can release the unicast connection establishment. In order to release the unicast connection establishment, the direct communication terminal 120 transmits an AAI-DC-Link Release-Command (AAI-DC-LREL-CMD) message to the forwarding terminal 110 (S428).

Upon successfully receiving the AAI-DC-Link Release-Command (AAI-DC-LREL-CMD) message, the forwarding terminal 110 transmits a reception success acknowledgment (ACK) to the direct communication terminal 120 over an auxiliary channel (S430).

Upon receiving the reception success acknowledgment (ACK), the direct communication terminal 120 can terminate the connection establishment.

After completion of a network entry procedure between the forwarding terminal 110 and the base station 200, the forwarding terminal 110 has to first perform a multicast forwarding initiation procedure in order to provide a downlink multicast service. That is, the multicast forwarding initiation procedure is performed before multicast connection establishment.

Figure 5:
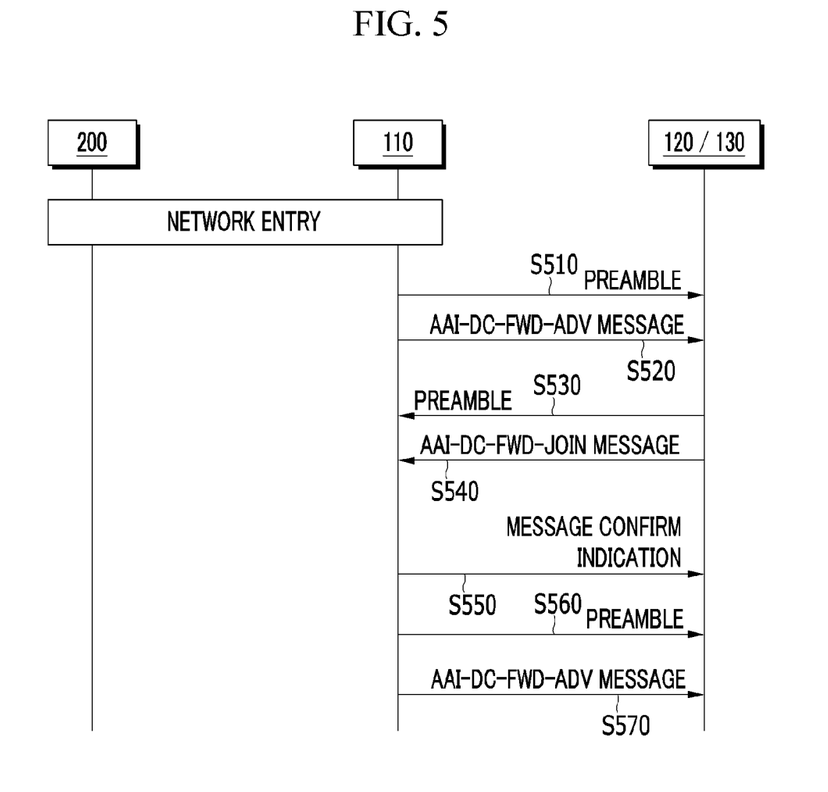
FIG. 5 is a view showing a method for initiating multicast forwarding in accordance with an exemplary embodiment of the present invention.

FIG. 5 is a view showing a method for initiating multicast forwarding in accordance with an exemplary embodiment of the present invention.

Referring to FIG. 5, upon completion of the network entry procedure between the forwarding terminal 110 and the base station 200, the forwarding terminal 110 performs a multicast forwarding initiation procedure with the direct communication terminals 120 and 130, in order to provide a downlink multicast service.

The forwarding terminal 110 transmits a preamble to the direct communication terminals 120 and 130 to initiate multicast forwarding (S510).

Next, the forwarding terminal 110 transmits an AAI-DC-forwarding-advertisement (AAI-DC-FWD-ADV) message to the direct communication terminals 120 and 130 by piggybacking it on an RTS message (S520). As shown in Table 4, the AAI-DC-forwarding-advertisement (AAI-DC-FWD-ADV) message may include the identifier (DCTID) of the forwarding terminal 110, a list of candidate DCGIDs, a list of on-going DCGIDs, a unicast resource (service slot), and a Message Change Count.

The forwarding terminal 110 is aware of list of DCGIDs that it can forward and multicast service IP addresses mapped to these DCGIDs in advance, and these DCGIDs can be transmitted as a list of candidate DCGIDs in the AAI-DC-forwarding-advertisement (AAI-DC-FWD-ADV) message. The forwarding terminal 110 forwards only the traffic corresponding to a DCGID received by an AAI-DC-FWD-JOIN message from the direct communication terminals 120 and 130, among the list of candidate DCGIDs. This DCGID is registered in the list of on-going DCGIDs managed by the forwarding terminal 110, and the forwarding terminal 110 includes this DCGID on the list of on-going DCGIDs and broadcasts it. However, in the case of broadcast services, which all the direct communication terminals can receive, a broadcast identifier can be included on the list of on-going DCGIDs and transmitted in the AAI-DC-forwarding-advertisement (AAI-DC-FWD-ADV) message, without a specific message (AAI-DC-FWD-JOIN).

In addition, the direct communication terminals 120 and 130 are informed through Forwarding Unicast Status that the forwarding terminal 110 has a unicast connection established with the direct communication terminals 120 and 130 and uplink is being used, thereby preventing unnecessary uplink connection attempts from the direct communication terminals 120 and 130.

TABLE 4

| Field | Size (bits) | Value/Description | Condition |
|---|---|---|---|
| Forwarding DCTID | 24 | DC Terminal Identifier. Indicate the HR-MS which forwards the direct communication data between HR-BS and HR-MSs which are not connected to the infra-structure | Shall always be present |
| For (i=0; i<N Candidate DCGID; i++) { | | N Candidate DCGID is the number of Group Service which can be served by the forwarding HR-MS Range [0 . . . 36] | |
| Candidate DCGID | 24 | DC Group Identifier. Indicate a DC Group list which can be supported by the forwarding HR-MS | |
| } | | | |
| For (i=0; i<N On-Going DCGID; i++) { | | N On-Going DCGID is the number of on-going Group Service which is served by the forwarding HR-MS Range [0 . . .36] | |
| On-Going DCGID | 24 | DC Group Identifier. Indicate a DC Group list which is currently served by the forwarding HR-MS | |
| } | | | |
| Forwarding Unicast Status | 1 | Indicate that the Forwarding HR-MS is available for forwarding unicast services toward HR-BS 0x0: available 0x1: currently forwarding packets | |
| Message Change Count | 4 | Message Change Count from the corresponding AAI-FWD-ADV | ?? |
| Reserved | 2 | | |

That is, the AAI-DC-forwarding-advertisement (AAI-DC-FWD-ADV) message is a message used to inform neighboring direct communication terminals that the forwarding terminal 110 is capable of forwarding to a backbone network, and to broadcast service status information containing a list of candidate DCGIDs, a list of on-going DCGIDs, etc. The list of candidate DCGIDs indicates a DCGID list whose traffic has not been forwarded to the direct communication terminals 120 and 130. The list of on-going DCGIDs indicates a DCGID list whose traffic is being transmitted or to be transmitted to the direct communication terminals 120 and 130.

The forwarding terminal 110 is able to periodically broadcast an AAI-DC-forwarding-advertisement (AAI-DC-FWD-ADV) message.

The direct communication terminals 120 and 130 receive the AAI-DC-forwarding-advertisement (AAI-DC-FWD-ADV) message from the forwarding terminal 110, and then transmit a preamble to the forwarding terminal 110 in order to send a multicast forwarding request to a multicast group (S530).

Next, the direct communication terminals 120 and 130 transmit an AAI-DC-FWD-JOIN message to the forwarding terminal 110 (S540). The AAI-DC-FWD-JOIN message can be used when it is desired to receive a non-on-going DCGID in the AAI-DC-forwarding-advertisement (AAI-DC-FWD-ADV) message. As shown in Table 5, the AAI-DC-FWD-JOIN message may contain a DCGID that is desired to be received. The DCGID desired to be received may be one among the list of candidate DCGIDs in the AAI-DC-forwarding-advertisement (AAI-DC-FWD-ADV) message.

TABLE 5

| Field | Size (bits) | Value/Description | Condition |
|---|---|---|---|
| For (i=0; i<N DCGID; i++) { | | N DCGID is the number of Group identifier which are subscribed by an HR-MS, but are not in the on-going DCGID of AAI-DC-FWD-ADV Range [0 . . . 36] | |
| DCGID | 24 | DC Group Identifier. | |
| } | | | |

Upon receiving the AAI-DC-FWD-JOIN message, the forwarding terminal 110 transmits a message conform indication to the direct communication terminals 120 and 130 (S550).

Next, the forwarding terminal 110 transmits a preamble to the direct communication terminals 120 and 130 for service updates (S560), and transmits AAI-DC-forwarding-advertisement (AAI-DC-FWD-ADV) message, along with an RTS message, to the direct communication terminals 120 and 130 (S570), thereby informing the direct communication terminals 120 and 130 about the service updates. In this case, the direct communication terminals 120 and 130 can confirm the DCGID requested by themselves through the received AAI-DC-forwarding-advertisement (AAI-DC-FWD-ADV) message.

Next, as explained in FIG. 3, the forwarding terminal 110 can establish a multicast connection, and then provide a multicast packet to the direct communication terminals 120 and 130.

Meanwhile, if a new direct communication terminal appears, this new direct communication terminal checks whether any DCGID desired to be received exists in AAI-DC-FWD-ADV before sending the forwarding terminal 110 a request (AAI-DC-FWD-JOIN) for DCGIDs desired to be received. If any DCGID desired to be received exists in a list of on-going DCGIDs, the new direct communication terminal waits to receive a periodic preamble for multicast and a an AAI-DC-Link establishment command (AAI-DC-LEST-CMD) message.

Figure 6:
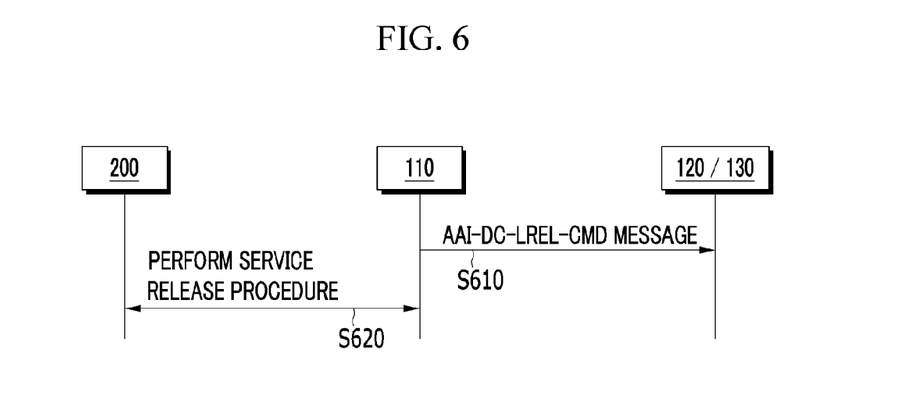
FIG. 6 is a view showing a method for stopping multicast forwarding in accordance with an exemplary embodiment of the present invention.

FIG. 6 is a view showing a method for stopping multicast forwarding in accordance with an exemplary embodiment of the present invention.

Referring to FIG. 6, when the forwarding terminal 110 provides multicast service to the direct communication terminals 120 and 130, if there is no signal received from the direct communication terminals 120 and 130 over an auxiliary channel for a predetermined period of time, it may perform a multicast connection release procedure, in order to stop multicast service forwarding.

In order to perform the multicast connection release procedure, the forwarding terminal 110 releases the direct communication link by multicast-transmitting an AAI-DC-Link Release Command (AAI-DC-LREL-CMD) message (S610). Also, the forwarding terminal 110 releases service with the base station (S620). The AAI-DC-Link Release Command (AAI-DC-LREL-CMD) message may contain a DCGID that is desired to be canceled.

Figure 7:
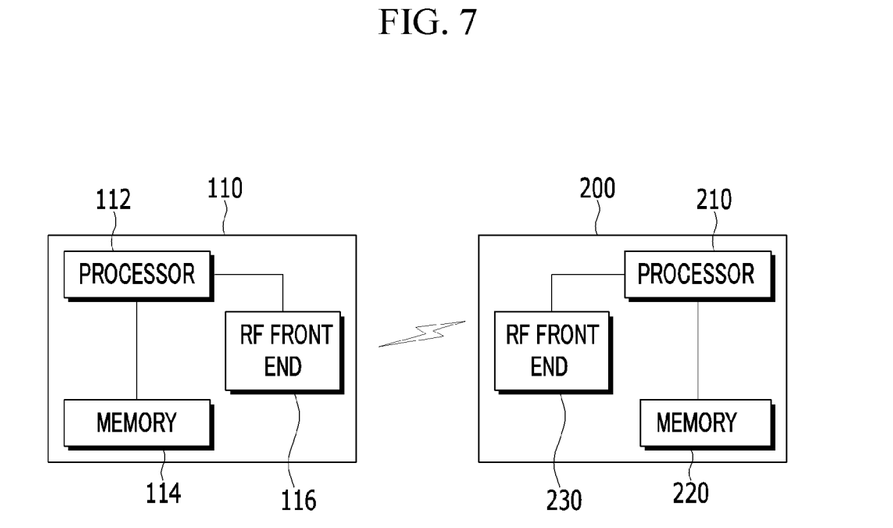
FIG. 7 is a view showing a forwarding terminal and a base station in accordance with an exemplary embodiment of the present invention.

FIG. 7 is a view showing a forwarding terminal and a base station in accordance with an exemplary embodiment of the present invention.

Referring to FIG. 7, the forwarding terminal 110 includes a processor 112, a memory 114, and a Radio Frequency (RF) front end 116. The base station 200 includes a processor 210, a memory 220, and an RF front end 230.

The processor 112 and 210 may be configured to implement the procedures and/or methods proposed in the exemplary embodiments of the present invention. The memory 114 and 220 is connected to the processor 112, and stores various information related to the operation of the processor 112 and 210. The RF front end 116 and 230 is connected to the processor 112 and 210, and transmits and/or receives radio signals. The base station 200 and/or the forwarding terminal 110 may have a single antenna or multiple antennas.

In addition, the direct communication terminals 120 and 130 also may be configured in the same manner as the forwarding terminal 110.

According to an embodiment of the present invention, at least one of terminals participating in talk-around direct communication can exchange information with a backbone network through a base station.

Moreover, communication infrastructure services can be provided to a terminal not connected to the backbone network through the terminal capable of exchanging information with the backbone network, without the base station needing to manage the terminal not connected to the backbone network.

The embodiments of the present invention may not necessarily be implemented only through the foregoing devices and/or methods, but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of performing direct communication between a forwarding terminal connected to a base station and a direct communication terminal not connected to the base station, the method comprising:
   receiving a multicast packet from the base station;
   establishing a multicast connection with at least one direct communication terminal having a direct communication group identifier mapped to a multicast IP address of the multicast packet; and
   transmitting the multicast packet to the at least one direct communication terminal.

2. The method of claim 1, wherein
   the establishing comprises transmitting a link establishment command message to the at least one direct communication terminal.

3. The method of claim 1, further comprising broadcasting to a plurality of direct communication terminals a forwarding advertisement message for indicating service status information.

4. The method of claim 3, wherein the forwarding advertisement message contains at least one of the following: the identifier of the forwarding terminal, a list of candidate direct communication group identifiers, and a list of on-going direct communication group identifiers.

5. The method of claim 4, wherein the performing of a multicast forwarding initiation procedure further comprises receiving a forwarding join message from one of the at least one direct communication terminal,
   the forwarding join message containing a direct communication group identifier, among the list of candidate direct communication group identifiers, that is mapped to the multicast packet the at least one direct communication terminal wants to receive.

6. The method of claim 5, wherein the performing of a multicast forwarding initiation procedure further comprises establishing a service connection with the base station, in order to provide the multicast packet mapped to the direct communication group identifier contained in the forwarding join message.

7. The method claim 1, further comprising, if there is no signal received from the at least one direct communication terminal for a predetermined period of time, releasing the multicast connection with the at least one direct communication terminal.

8. The method of claim 7, wherein
   the releasing comprises transmitting a direct communication link release command message to the at least one direct communication terminal.

9. The method of claim 1, further comprising transmitting a unicast packet from one direct communication terminal to the base station.

10. The method of claim 9, wherein
    the transmitting of a unicast packet to the base station comprises:
    receiving a link establishment request message for unicast connection establishment from the one direct communication terminal; and
    transmitting a response message to the one direct communication terminal in reply to the link establishment request message,
    the link establishment request message containing the identifier of the forwarding terminal and a currently on-going direct communication group identifier as destination information.

11. A method for performing direct communication between a forwarding terminal connected to a base station and a direct communication terminal not connected to the base station, the method comprising:
    receiving a multicast packet from the base station;
    transmitting a link establishment command message containing the direct communication group identifier to at least one direct communication terminal having a direct communication group identifier mapped to a multicast IP address of the multicast packet; and
    transmitting the multicast packet to the at least one direct communication terminal.

12. The method of claim 11, further comprising broadcasting to a plurality of direct communication terminals a forwarding advertisement message for indicating service status information,
    the forwarding advertisement message containing at least one of the following: the identifier of the forwarding terminal, a list of candidate direct communication group identifiers, and a list of on-going direct communication group identifiers.

13. The method of claim 12, further comprising receiving a forwarding join message from one of the at least one direct communication terminal,
    the forwarding join message containing a direct communication group identifier, among the list of candidate direct communication group identifiers, that is mapped to the multicast packet the at least one direct communication terminal wants to receive.

14. The method of claim 11, further comprising, if there is no signal received from the at least one direct communication terminal for a predetermined period of time, transmitting a direct communication link release command message to the at least one direct communication terminal.

15. The method of claim 11, further comprising:
- receiving a link establishment request message for unicast connection establishment from one of the at least one direct communication terminal;
- transmitting a response message to the one direct communication terminal in reply to the link establishment request message; and
- receiving a unicast packet from the one direct communication terminal,
- the link establishment request message containing a currently on-going direct communication group identifier as destination information.

* * * * *